United States Patent [19]
Granieri, Jr.

[11] 4,309,074
[45] Jan. 5, 1982

[54] VIEWING SCREEN
[76] Inventor: Michael S. Granieri, Jr., 1805 N. James St., Rome, N.Y. 13440
[21] Appl. No.: 68,663
[22] Filed: Aug. 22, 1979

Related U.S. Application Data
[63] Continuation-in-part of Ser. No. 855,238, Nov. 28, 1977, abandoned.
[51] Int. Cl.³ .......................... G02B 3/08; G02B 3/12; G02B 27/22
[52] U.S. Cl. .................................... 350/144; 350/419; 350/452
[58] Field of Search ........................... 358/89; 353/10; 350/144, 180, 295, 452; 313/474

[56] References Cited
U.S. PATENT DOCUMENTS

| | | | |
|---|---|---|---|
| 2,077,092 | 4/1937 | Broder | 350/211 |
| 2,361,390 | 11/1944 | Ferrill, Jr. | 358/89 X |
| 3,053,144 | 9/1962 | Harries et al. | 350/211 X |
| 3,493,290 | 2/1970 | Traub | 350/295 X |
| 3,632,184 | 1/1972 | King | 350/144 X |
| 3,632,866 | 1/1972 | King | 358/89 X |
| 3,809,461 | 5/1974 | Baumgardner et al. | 350/211 X |
| 4,130,832 | 12/1978 | Sher | 350/295 X |

OTHER PUBLICATIONS
Withey, E. L., "Cathode Ray Tube Adds Third Dimension", *Electronics*, 5/23/58, pp. 81–83.
Appel, A. et al., "Techniques for Displaying Solid Objects on a Varifocal Mirror", *IBM Technical Disclosure Bulletin*, vol. 15, No. 3, 8/72, pp. 840–845.
Rawson, E. G., "Vibrating Varifocal Mirrors for 3-D Imaging", *IEEE Spectrum*, vol. 6, No. 9, Sep. 1969, pp. 37–43.

*Primary Examiner*—John K. Corbin
*Assistant Examiner*—Scott J. Sugarman

[57] ABSTRACT

A thin rectangular hollow-boxed viewing screen containing a thin, flexible, soft, convex Fresnel lens; is placed and aligned in front of a T.V. set. Audio sound waves are used to continuously vary the radius of curvature, the focal position, the angle of incidence, effective thickness and shape of the lens medium. All of these changes are made in a continuous and rapid manner that produces pseudo three-dimensional images from a two-dimensional source. The rectangular box-like viewing screen is simple in design and construction; economical to manufacture, easy to install and use, all with no changes or modifications to the television set required.

9 Claims, 7 Drawing Figures

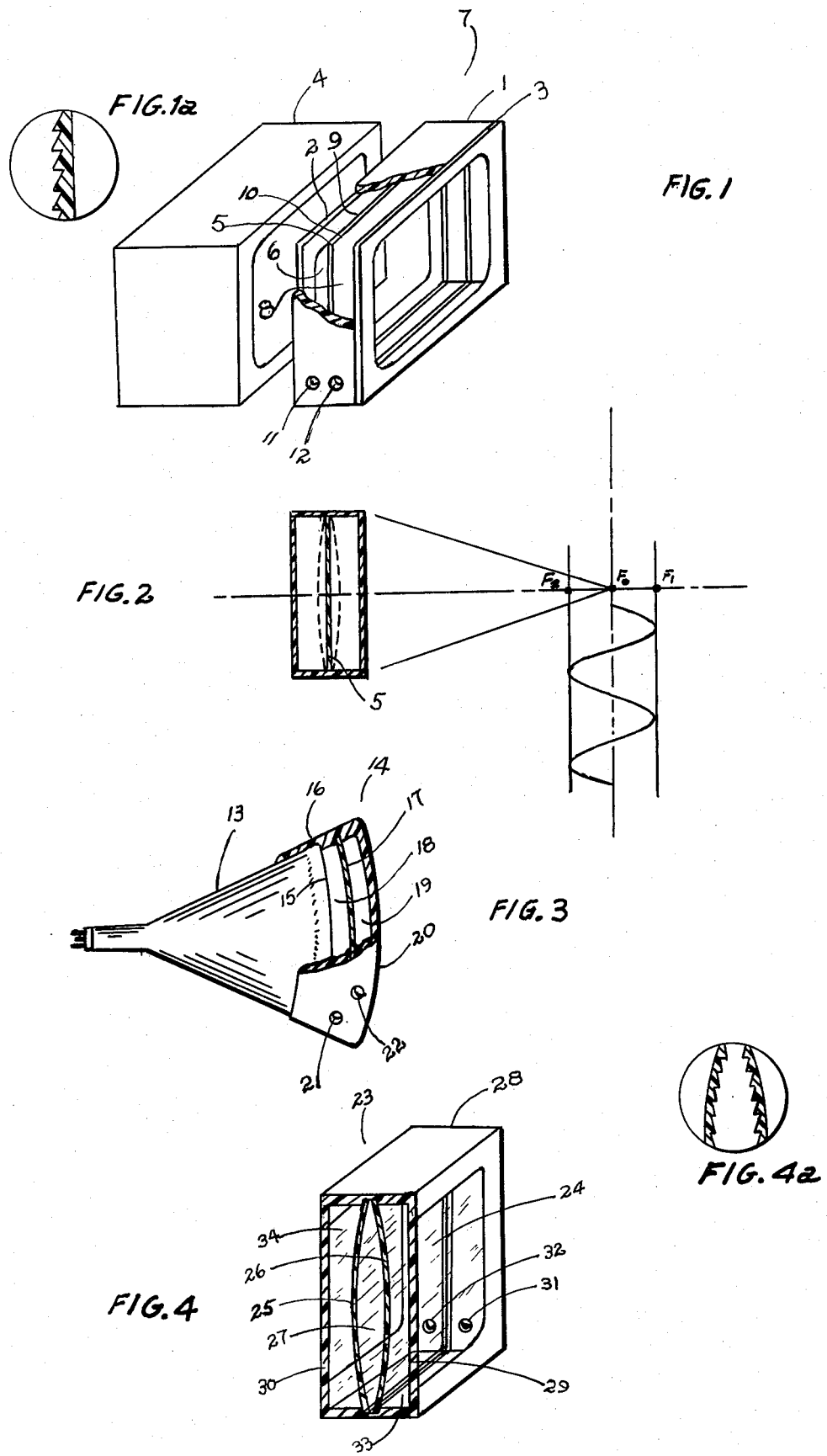

VIEWING SCREEN

This application is a continuation in part of my co-pending application Ser. No. 855,238 now abandoned, filed Nov. 28, 1977.

BACKGROUND OF THE INVENTION

1. Field of the Invention

The present invention relates to a uniquely simplified method in producing depth illusion, and more particularly to a novel viewing screen which presents pseudo three-dimensional imagery from a two-dimensional image source. This invention is applicable to motion pictures, still pictures, flat photographs or other types of two-dimensional images where depth is desired. This invention is easily adaptable to television sets, motion picture screens, billboard displays and posters. However, the main thrust of this invention is aimed at viewers of T.V. and motion pictures, where the demand for 3D is high.

2. Description of the Prior Art

Currently there are numerous methods and devices known in the prior state-of-the-art which attempts to provide various means for viewing 3D from 2D images, but are, however, overly complicated and expensive to produce; and in some cases not practical for home T.V. or motion picture viewing. Some devices and methods are described in the U.S. Pat. Nos:

- 3,502,390 issued Mar. 24, 1970/2,884,833 issued May 5, 1959;
- 3,680,949 issued Aug. 1, 1972/3,240,549 issued Mar. 15, 1966;
- 3,460,882 issued Aug. 12, 1969/3,536,832 issued Oct. 27, 1970;
- 3,501,230 issued Mar. 17, 1970/3,597,042 issued Aug. 3, 1971;
- 3,493,290 issued Feb. 3, 1970/3,632,184 issued Jan. 1972.

The present invention is an improvement over these patents in terms of simplicity, cost, adaptability and practicality. In most cases, the patent inventions require extensive modifications to the commercial television set or require additional viewing apparatuses which are too cumbersome and not practical for home T.V. viewing. The present invention overcomes all of these difficulties.

SUMMARY

This invention relates to a unique method and novel viewing screen that is comprised of an enclosed housing or chamber that is transparent and easily adapted for alignment with a television screen. The housing contains a thin, soft, and flat flexible Fresnel lens system that is mounted internally. The radius of curvature of this lens system is varied continuously over continuous rapid periods by audio sound waves above the flicker perception frequency of the human eye, i.e., above 15 Hz (15 CPS). The change in radius of curvature directly causes a change of angle of incidence which in turn causes a change in focal position; this simulates a change of index in the refractive medium. In addition, by rapidly varying the radius of curvature, physical changes in the len's shape and effective thickness is accomplished. All of these effects, combined with flicker rate perception of the human eye, produce the appearance of three-dimensional imagery. The flicker perception frequency is the rate at which the human eye can perceive changes in intensity of light. At rates above 15 Hz, the human eye cannot detect changes in light intensity, hence the vision creates an impression of 3D imagery. It is therefore the primary object of the present invention to provide T.V. viewers with a novel viewing screen which is simple in construction, economical to manufacture, and presents pseudo three-dimensional images without making changes or modifications to a television set, and without the necessity of cumbersome equipments.

Another object of this invention is to provide a novel viewing screen which does not require electrical motors, rotary switches, special filters or special viewing glasses.

Still another object of this invention is to provide adaptability of the novel viewing screen to a T.V. set by merely placing or aligning the novel viewing screen in front of a T.V. set.

And still another object of this invention is to provide a novel viewing screen without restricting the number of T.V. viewers that would normally view conventional T.V. Much of the prior art restricts the number of viewers by the area, size or shape of screen, or by the viewing angle required to view three-dimensional images.

Other objects of this invention will become more familiar and its advantages better understood with the following detailed description with the accompanying drawings.

BRIEF DESCRIPTION OF THE DRAWING

FIG. 1 is a perspective view partly cut section of the novel viewing screen assembly aligned with the T.V. set, which is the preferred embodiment of the invention.

FIG. 1a is a magnified cutaway view of the lenses of FIGS. 1, 2, and 3.

FIG. 2 is a side cut away view of FIG. 1 which illustrates the physical oscillatory motion of the lens when the lens is vibrated by an external audio generator source.

FIG. 3 shows a partly cut away side view of another embodiment of the invention which illustrates the adaptability of the novel viewing screen on the face of a T.V. picture tube.

FIG. 4 is a perspective cut away half view of still another embodiment of the invention.

FIG. 4a is a magnified cutaway view of the lens in FIG. 4.

DETAILED DESCRIPTION OF THE PREFERRED EMBODIMENT

Figure 5:
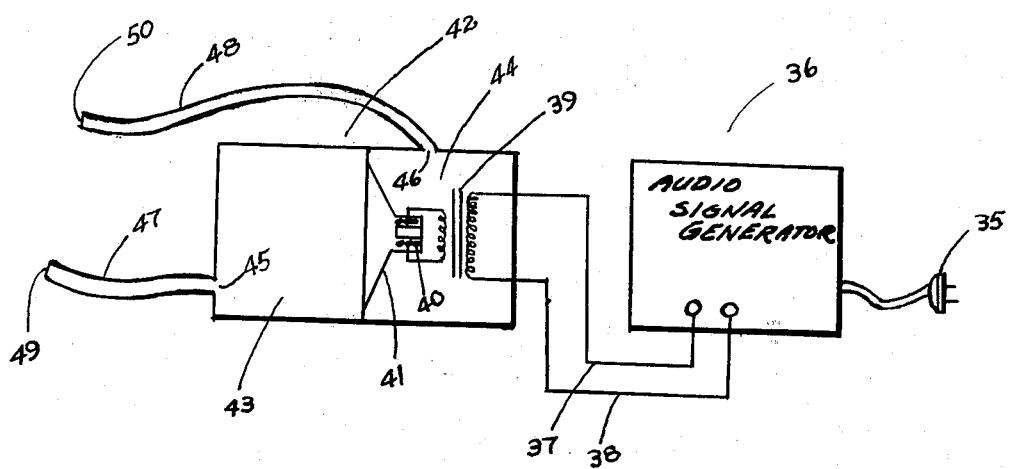
FIG. 5 shows the audio signal generator source with transducer box which drives the Fresnel lens into oscillatory motion.

Referring generally to FIG. 1, a novel viewing screen 7 in accordance with the present invention is adapted to provide depth illusion and present pseudo three-dimensional viewing for T.V. viewers. The novel viewing screen 7, is comprised of a boxed-hollow transparent housing 1 having six enclosed sides, with side 2 and side 3 having the same cross sectional area as the viewing screen of the image source 4. The remaining sides of housing 1 are much less in cross sectional area, that the overall geometrical shape of the novel viewing screen 7 assumes the shape of a thin rectangular box-like structure, suitable for alignment with the image source 4. The shape of the housing 1 is not critical to the practice of this invention and could assume other shapes and sizes, depending on the viewing size of the image source 4, many modifications can be made within the spirit and scope of the invention. However, it will be recognized that side 2 and 3 of housing 1 should be constructed from wood, plastic, or metal. Mounted within the housing 1 is a thin, soft, flat, flexible convex lens 5 of the Fresnel type and positioned adjacently parallel between side 2 and side 3 and evenly dividing housing 1 into chamber 6 and chamber 8. Lens 5 has approximately the same cross sectional area as either side 2 or side 3 and has a back surface 9 and front surface 10 with its outer edges mounted to the housing 1. Lens 5 is thin, soft, clear and flexible so that it can be physically vibrated by audio sound waves. The audio sound waves are produced from an audio signal generator shown in FIG. 5. A discussion on the method used to pipe the audio sound waves to the novel viewing screen is included at the end of the embodiment of this specification. Lastly, chamber 6 and chamber 8 have entrance input hole 11 and entrance input hole 12 for purposes of piping audio sound waves into chamber 6 and chamber 8. As audio sound waves are fed and piped to entrance hole 11 and entrance hole 12, the radius of curvature of lens 5 in novel viewing screen 7, physically stretches and vibrates in a rapid oscillatory motion, causing changes of the focal position of lens 5. This continuous rapid oscillatory motion is caused by audio sound waves pushing air against the back side of lens 5 in chamber 6 and against the front side of lens 5 in chamber 8. FIG. 2 best illustrates this oscillatory motion of the radius of curvature of lens 5. Referring to FIG. 2, as audio sound waves are applied, the focal position of lens 5 travels front $F_0$ to $F_1$ back to $F_2$ thru $F_0$ along its optical axis. During this physical oscillatory motion, the lens medium is experiencing continuous and rapid changes in angles of incidence, as well as physical changes in the lens' radius of curvature. By producing changes in angles of incidence, the lens medium is effectively simulating rapid changes in indexes of refraction. By varying these paramenters of the lens medium, lens 5 of novel viewing screen 7 produces depth illusion suitable for three-dimensional viewing. FIG. 3 constitutes an alternate embodiment of this invention. Referring now to FIG. 3, there is shown a side view of a T.V. picture tube 13 with a modified novel viewing screen 14 physically attached to the face 15 of the tube 13. The housing 16 is constructed from rigid transparent plastic material and is contoured to the shape of the face 15 of the T.V. picture tube 13 and attached to the T.V. picture tube 13. Inserted within housing 16 is a lens 17 mounted and positioned adjacently parallel between the face 15 of the T.V. tube and side 20 of housing 16 and evenly dividing housing 16 into chamber 18 and chamber 19. Lens 17 is similar in construction to the lens 5 described in FIG. 1. Audio sound waves are fed and piped to entrance hole 21 and entrance hole 22 to chamber 18 and to chamber 19 respectively. The operational theory for this alternate embodiment is similar to the operational theory explained for novel viewing screen 7 in FIG. 1. An additional embodiment of novel viewing screen 14 is that the audio frequency source is available within the commercial T.V. set and can be conveniently used or conveyed to vibrate lens 17 of novel viewing screen 14. There is still another embodiment of this invention as shown in FIG. 4. Referring to FIG. 4, the drawing shows a perspective view of a half cut away view of a novel viewing screen 23 which illustrates the lens structure for this particular embodiment. The lens 24 is constructed slightly different from lens 5 and lens 17 described for novel viewing screen 7 and 14 in FIG. 1 and FIG. 3. Lens 24 is comprised of two circular, almost flat flexible convex Fresnel lens, i.e., lens 25 and lens 26 are physically placed back to back, forming a conventional double convex lens shape, with an enclosed center inner chamber 27. Lens 24 is mounted and positioned in housing 28 adjacent and parallel to side 29 and side 30 of housing 28. Audio sound waves are fed and piped to entrance hole 31 for chamber 33 and entrance hole 32 for chamber 34. The theory of operation described for novel viewing screen 7 in FIG. 1 and referenced in FIG. 2, is similar for novel viewing screen 23 in FIG. 4. As audio sound waves are fed and piped to entrance hole 31 and entrance hole 32 of chamber 33 and chamber 34 respectively, the back surface 25 and front surface 26 of the convex shaped hollow lens 24, physically vibrates and stretches at the frequency of the piped audio waves causing a rapid and continuous change in focal position and lens thickness. The enclosed center inner chamber 27 is filled with air pressure so as to prevent lens 24 from collapsing due to the rapid oscillatory motion. By rapidly varying the radius of curvatures of lens 24 the physical thickness of lens 24 is also effectively varied. This effective thickness variation causes near images of a flat picture to be nearer and far images to be further away. This illusion of depth is what is commonly referred to as pseudo three-dimensional viewing. It should be understood that many modifications could be made to the preferred embodiment of this invention, without departing from the spirit and the scope of this invention, and it should also be recognized that all alternate embodiments presented in this invention can be incorporated into the preferred embodiment without sacrificing its intent for adaptability and simplicity. In particular, it should be understood that in some instances it is unnecessary to provide either front or rear wall panel. These may be provided by the 2D image source; e.g., the chamber is boarded by a billboard or movie picture screen or T.V. screen and enclosed by a Fresnel lens. Audio sound waves are fed between the image wall panel and the lens, thereby vibrating the lens and producing 3D. Lastly, as shown in FIG. 5, an audio signal generator source with a transducer box is used to drive the Fresnel lens system into oscillatory motion above the flicker perception frequency of the human eye. Referring now to FIG. 5, as 60 cycle power is applied to power plug 35, audio signal generator 36 produces audio voltage above 15 Hz in frequency that is sent over wires 37 and 38 respectively. A transformer 39 is included to bring the voltage to a magnitude for which the voice coil 40 may work and drive speaker 41 of transducer box 42. The audio sound waves produced by speaker 41 creates a differential air pressure in chambers 43 and 44 of transducer box 42. This differential air pressure is passed through entrance hole 45 and 46 of transducer box 42 and through plastic pipe tubing 47 and 48 (plastic pipe tubing referred to here are tubes that are capable of passing the pressure differential at the frequencies required.) which when ends 49 and 50 of plastic pipe tubing 47 and 48 are connected to entrance hole 11 and 12 of FIG. 1, a corresponding differential air pressure is created in chamber 6 and 8. This differential air pressure causes lens 5 of FIG. 1 and as described in FIG. 2 to be driven into an oscillatory motion. The differential air pressure in chamber 6 and 8 of FIG. 1 are changing at the same rate as the audio frequency generator voltage; and therefore lens 5 of FIG. 1 will flex or oscillate in response to the differential air pressure in chamber 43 and 44 of transducer box 42 of FIG. 5 which is at the same rate as the audio signal generator 36. The same theory of operation and use of the apparatus of FIG. 5, is applied to FIGS. 3 and 4 of this specification.

What is claimed is as follows:

1. A novel viewing screen comprised of:
   a boxed-rectangular hollow transparent housing having six enclosed sides with the front and back sides having the same cross sectional area as a two-dimensional image source to be viewed and easily aligned and adaptable to said image source;
   a thin, flat, soft, flexible convex Fresnel type lens structure mounted and positioned adjacent and parallel between the front and back sides of the housing and dividing the housing into two chambers; means for supplying audio energy to set chambers to vibrate Fresnel lens structure at a frequency above the flicker frequency of the human eye to thereby give said two-dimensional image source the appearance of three-dimensions.

2. The novel viewing screen of claim 1 adapted to the face of a T.V. receiver and further comprised of:
   a curved housing contoured to the shape of the face of the T.V. receiver and attached to said T.V. receiver; said Fresnel lens structure mounted and positioned adjacent and parallel between said front side and said back side of said housing, dividing said housing into two equal chambers, with each chamber having an entrance hole that allows audio sound waves to be fed to or piped to said chambers.

3. The novel viewing screen of claim 2 wherein said Fresnel lens structure is comprised of two almost flat, thin, and flexible convex lens; forming a true double convex lens with an enclosed inner chamber; and wherein the double convex lens is placed and mounted adjacent and parallel between said front side and said back side of said housing, dividing the housing into said two equal chambers, each having an entrance hole that allows audio sound waves to be fed to said two equal chambers.

4. A viewing screen for producing a pseudo three-dimensional image to a viewer when viewing a two-dimensional image source through said screen, comprising:
   a transparent Fresnel type lens structure substantially coextensive in area with said two-dimensional image source; means for mounting said lens in close proximity to said two-dimensional image source between said two-dimensional image source and a viewer; and means for vibrating said lens in a direction substantially along its optical axis at a frequency above the flicker perception frequency of the human eye to thereby produce a pseudo three-dimensional image of said two-dimensional image source.

5. Apparatus according to claim 4 wherein said lens structure comprises two Fresnel type lenses positioned back-to-back.

6. Apparatus according to claim 5 wherein said vibrating means comprises means to displace said back-to-back lenses with respect to one another.

7. Apparatus according to claim 6 wherein said vibrating means operates to continuously change the effective thickness of said lens structure.

8. Apparatus according to claim 4 wherein said vibrating means operates to change the effective radius of curvature of said lens structure.

9. The method of producing a pseudo three-dimensional image when viewing a two-dimensional image source comprising the steps of:
   placing a flexible Fresnel type lens structure adjacent to said two-dimensional image source between said two-dimensional image source and the viewer and vibrating said lens structure at a frequency above the flicker perception frequency of the human eye to thereby produce said pseudo three-dimensional image.

* * * * *